(12) United States Patent
Artoni et al.

(10) Patent No.: US 10,399,834 B2
(45) Date of Patent: Sep. 3, 2019

(54) LEVELLING GROUP FOR AERIAL WORK PLATFORMS

(71) Applicant: ALMAC S.R.L., Guastalla (RE) (IT)

(72) Inventors: Andrea Artoni, Luzzara (IT); Pietro Agosta Del Forte, Viadana (IT)

(73) Assignee: ALMAC S.R.L., Guastalla (RE) (IT)

( * ) Notice: Subject to any disclaimer, the term of this patent is extended or adjusted under 35 U.S.C. 154(b) by 0 days.

(21) Appl. No.: 15/500,757

(22) PCT Filed: Jul. 21, 2015

(86) PCT No.: PCT/IB2015/001224
§ 371 (c)(1),
(2) Date: Jan. 31, 2017

(87) PCT Pub. No.: WO2016/020733
PCT Pub. Date: Feb. 11, 2016

(65) Prior Publication Data
US 2017/0217745 A1    Aug. 3, 2017

(30) Foreign Application Priority Data
Aug. 4, 2014  (IT) ............................. RE2014A0072

(51) Int. Cl.
*B66F 11/04* (2006.01)
*B62D 21/00* (2006.01)
(Continued)

(52) U.S. Cl.
CPC ............ *B66F 11/042* (2013.01); *B62D 21/00* (2013.01); *B62D 55/06* (2013.01); *B62D 55/075* (2013.01);
(Continued)

(58) Field of Classification Search
CPC .... B62D 55/06; B62D 55/062; B62D 55/065; B62D 55/0655; B62D 21/00; B66F 11/042; B62B 17/04; F21W 2131/1005
See application file for complete search history.

(56) References Cited

U.S. PATENT DOCUMENTS 4,273,214 A * 6/1981 Grove ................... B66F 11/046
                                                       180/9.58
4,304,313 A * 12/1981 van der Lely ......... B62D 11/18
                                                       180/15
(Continued)

FOREIGN PATENT DOCUMENTS

EP        2374635 A1   10/2011
GB        1130475 A    10/1968
(Continued)

*Primary Examiner* — Daniel P Cahn
(74) *Attorney, Agent, or Firm* — Volpe and Koenig, P.C.

(57) ABSTRACT

A supporting and levelling group for aerial work platforms includes a support base for supporting a containing cage of an aerial work platform and a support frame hinged to the support base so as to be able to oscillate with respect to an oscillation axis. The supporting and levelling group also includes at least a pair of ground rest elements hinged independently to the support frame, with respect to respective articulation axes parallel to one another and substantially perpendicular to the oscillation axis, such as to be able to independently vary a height thereof with respect to the support base.

9 Claims, 5 Drawing Sheets

(51) Int. Cl.
  *B62D 55/00* (2006.01)
  *B66F 17/00* (2006.01)
  *B62D 55/06* (2006.01)
  *B66F 13/00* (2006.01)
  *B62D 55/075* (2006.01)
  *F21W 131/10* (2006.01)

(52) U.S. Cl.
  CPC ............ *B66F 13/00* (2013.01); *B66F 17/006*
  (2013.01); *F21W 2131/1005* (2013.01)

(56) References Cited

U.S. PATENT DOCUMENTS

| | | | | |
|---|---|---|---|---|
| 4,466,509 A * | 8/1984 | Kishi | ............... | B66F 11/042 182/141 |
| 4,558,758 A * | 12/1985 | Littman | ............... | B62D 7/026 180/236 |
| 4,650,017 A * | 3/1987 | Pelletier | ............... | A01G 23/083 180/41 |
| 4,741,413 A * | 5/1988 | Kishi | ............... | B66F 11/042 182/141 |
| 4,763,742 A * | 8/1988 | Langford | ............... | A01G 23/081 144/34.5 |
| 4,823,852 A * | 4/1989 | Langford | ............... | A01G 23/081 144/4.1 |
| 4,982,853 A * | 1/1991 | Kishi | ............... | B66C 23/701 212/230 |
| 5,337,847 A * | 8/1994 | Woods | ............... | A01G 23/083 144/4.1 |
| 5,388,662 A * | 2/1995 | Tranchero | ............... | B66F 11/044 182/2.7 |
| 5,431,240 A * | 7/1995 | Merritt | ............... | B66F 11/046 180/9.1 |
| 5,938,300 A * | 8/1999 | Fukuda | ............... | B62D 55/116 298/18 |
| 6,165,283 A * | 12/2000 | Dahlin | ............... | B08B 5/04 134/21 |
| 6,241,263 B1 * | 6/2001 | Hicks | ............... | B60G 9/02 180/89.14 |
| 6,272,413 B1 * | 8/2001 | Takahashi | ............... | B66F 11/046 182/115 |
| 6,343,799 B1 * | 2/2002 | Moyer | ............... | B60G 17/005 180/89.14 |
| 6,425,459 B1 * | 7/2002 | Keefer | ............... | B66F 11/042 182/141 |
| 9,222,493 B2 * | 12/2015 | Riskas | ............... | F15B 21/085 |
| 9,464,405 B2 * | 10/2016 | Friend | ............... | E02F 3/437 |
| 9,752,336 B2 * | 9/2017 | Meinert | ............... | E04G 21/0463 |
| 9,790,695 B1 * | 10/2017 | Friend | ............... | E04G 21/0463 |
| 2009/0038186 A1 * | 2/2009 | Osswald | ............... | B62D 21/14 37/413 |
| 2010/0170747 A1 * | 7/2010 | Crook | ............... | B66F 11/046 182/2.2 |
| 2012/0051879 A1 * | 3/2012 | Davis | ............... | B66C 13/08 414/729 |
| 2013/0153333 A1 * | 6/2013 | Richards | ............... | B66F 11/044 182/18 |
| 2016/0179128 A1 * | 6/2016 | Guglielmo | ............... | B66F 11/04 182/19 |
| 2017/0291805 A1 * | 10/2017 | Hao | ............... | B60P 1/34 |

FOREIGN PATENT DOCUMENTS

| | | |
|---|---|---|
| KR | 20120104864 A | 9/2012 |
| WO | 2010109255 A1 | 9/2010 |

* cited by examiner

LEVELLING GROUP FOR AERIAL WORK PLATFORMS

TECHNICAL FIELD

The present invention relates to a levelling group for aerial work platforms. More precisely, the present invention relates to a levelling group for aerial work platforms and an aerial work platform comprising the levelling group.

PRIOR ART

As is known, use is frequent of aerial work platforms for enabling an operator to perform various tasks, such as for example construction or reconstruction work site operations and for maintenance of green areas.

The aerial work platforms generally comprise a cage raisable by using a pantograph or scissors-type device associated to an underlying levelling group comprising a support base of the cage and at least a pair of ground-resting elements, associated to the support base itself.

The pantograph or scissors mechanism enables actuating of the cage between a lowered position, substantially resting on the support base, and a raised position with respect to the support base.

The rest elements, such as for example wheels or tracks, appropriately motorised, not only support the aerial work platform, but also enable movement of the platform so that it can be positioned suitably in a place where the work operation using the platform is to take place.

Further, in addition to the rest elements, in order to guarantee the stability of the platform in the raised position, the platform generally comprises stabiliser elements, such as for example telescopic or removable feet that go to rest on the ground in spread-out positions with respect to the rest elements, thus guaranteeing a greater stability to the aerial work platform even where underlying terrain is not flat.

Often, for example, though not limitedly, where care and maintenance operations are being performed in green areas, the platform has to be set up on irregular surfaces, having larger or smaller slopes.

In these conditions it is therefore necessary to guarantee the safety of the operator in the cage by keeping the cage in a horizontal position.

In these circumstances, the use of stabiliser elements is practically indispensable, but making the aerial work platform safe using stabiliser elements is a very long operation and has to be repeated for each position in which the aerial work platform is set to work.

To make this type of intervention easier the present Applicant has researched a first solution which comprises a levelling group for aerial work platforms comprising: a support base for supporting a containing cage of an aerial work platform and at least a pair of ground rest elements hinged independently to the support base, with respect to respective articulation axes parallel to one another such as to be able to independently vary a height thereof with respect to the support base.

In this way the rest elements can independently vary the height thereof with respect to the support base so as to adapt to the underlying terrain while maintaining the support base and especially the cage in perfectly horizontal position, guaranteeing the safety of the operator, who, furthermore, can carry out the desired operation more rapidly and without the need to arrange different stabiliser elements on the ground.

Though this solution has been shown to be particularly effective in the uses it is destined for, it is not suited for use on particularly broken or irregular rest surfaces, in which for example the ground presents more than one slope line, such as on hills or the like.

An example of a support and levelling group for aerial work platforms is illustrated in document KR 2012 0104864.

In this support and levelling group, however, the ground rest elements are rotatably associated about a rotation axis (defined by the pins 17—the reference numerals refer to the figures of the prior art document) with respect to the support frame 21. In this way the tracks 21, which define the ground rest elements, cannot support alone, in an inclined condition of the group, the support and levelling group and the platform, as they would rest on a limited lateral border thereof, but stabiliser element 54 are required which spread out and lower below the level of the tracks 12 to define a stable rest for the inclined group.

An aim of the present invention is to obviate the above-mentioned drawbacks of the prior art, with a solution that is simple, rational and relatively inexpensive.

The aims are attained by the characteristics of the invention as reported in the independent claim. The dependent claims delineate preferred and/or particularly advantageous aspects of the invention.

DESCRIPTION OF THE INVENTION

The invention relates in particular to a levelling group for aerial work platforms comprising: a support base for supporting a containing cage of an aerial work platform, a support frame hinged to the support base so as to be able to oscillate with respect to an oscillation axis, at least a pair of ground rest elements hinged independently to the support frame, with respect to respective articulation axes parallel to one another and substantially perpendicular to the oscillation axis, such as to be able to independently vary a height thereof with respect to the support base.

In this way, the levelling group can be adapted to terrains with great irregularity thanks to the mobility of the rest elements and the support base about the respective hinge and oscillation axes.

In a further aspect of the invention, each rest element is hinged to the support frame by at least a four-bar hinge of the parallel type.

In this way the rest elements remain parallel to one another during actuation of the rest elements.

In a further aspect of the invention, each rest element comprises a group of motorised tracks each defining a longitudinal ground rest surface having a longitudinal axis parallel to the respective articulation axis.

With this solution, the levelling group rests on a pair of longitudinal rest surfaces that are spread out and distinct, and guarantee at the same time a high degree of stability to the levelling group itself and an equal and uniform distribution of the weight on the underlying terrain.

In a further aspect of the invention, the support and levelling group comprises, for each rest element, a respective first actuating group able to actuate a movement of the rest element with respect to the support frame.

With this solution, the oscillations of the rest elements can be actuated in a controlled way for an efficient levelling as a function of the slope or irregularity of the underlying terrain.

In a further aspect of the invention, each first actuating group comprises a first jack provided with a stem mobile internally of a cylinder, one from between the stem and the cylinder being hinged to the support frame and another from between the stem and the cylinder being hinged to the rest element on respective hinge axes parallel to the respective articulation axes.

In this way a first simple actuating group is made available that is also effective and relatively inexpensive.

In a further aspect of the invention, the support and levelling group comprises a second actuating group able to actuate a rotation movement of the support frame with respect to the support base.

With this solution, the support base can be actuated in rotation with respect to the support frame (and therefore with respect to the ground surface) in a controlled way for an efficient levelling as a function of the slope or irregularity of the underlying terrain.

In a further aspect of the invention, the second actuating group comprises a second jack provided with a stem mobile internally of a cylinder, one whereof being hinged to the support frame and another whereof being hinged to the support base on respective hinge axes parallel and offset to the oscillation axis.

In this way a second simple actuating group is made available that is also effective and relatively inexpensive.

In a further aspect of the invention, an aerial lift platform is disclosed which comprises a containing cage and a levelling group, as described in the foregoing, wherein the cage is superiorly associated to the support base.

With this solution, an aerial work platform is provided for carrying out a predetermined operation that is able to adapt, in all directions, slopes and irregularities in the rest surface defined by the underlying ground surface.

In a further aspect of the invention, the aerial lift platform comprises a raising device interposed between the support base and the cage, wherein the raising device is able to actuate the cage along a substantially vertical direction between a lowered position thereof in which the cage is proximal to the support base and a raised position thereof in which the cage is distal with respect to the support base.

In this way, the aerial work platform can raise an operator to a height for carrying out a predetermined operation, while maintaining the operator in safety and the cage stably in a horizontal position.

In a further aspect of the invention, the lift device comprises a pantograph type lift.

With this solution, the lift device is simple, effective and relatively inexpensive.

BRIEF DESCRIPTION OF THE DRAWINGS

Further characteristics and advantages of the invention will emerge from a reading of the following description, provided by way of non-limiting example with the aid of the figures illustrated in the appended tables of drawings.

BEST WAY OF CARRYING OUT THE INVENTION

Figure 1:
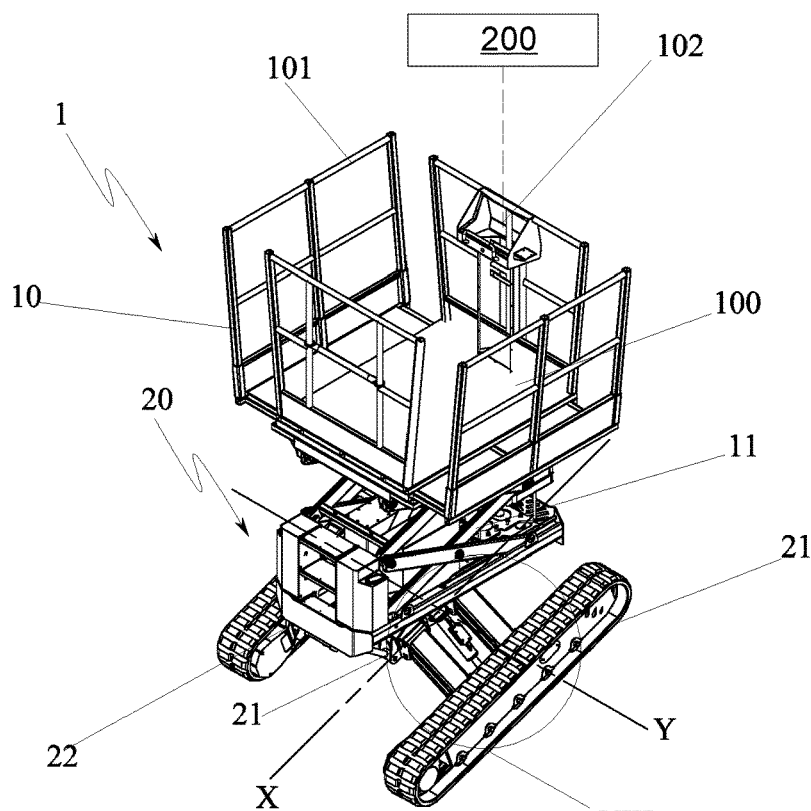
FIG. 1 is an axonometric view of an aerial work platform, according to the invention.
Figure 2:
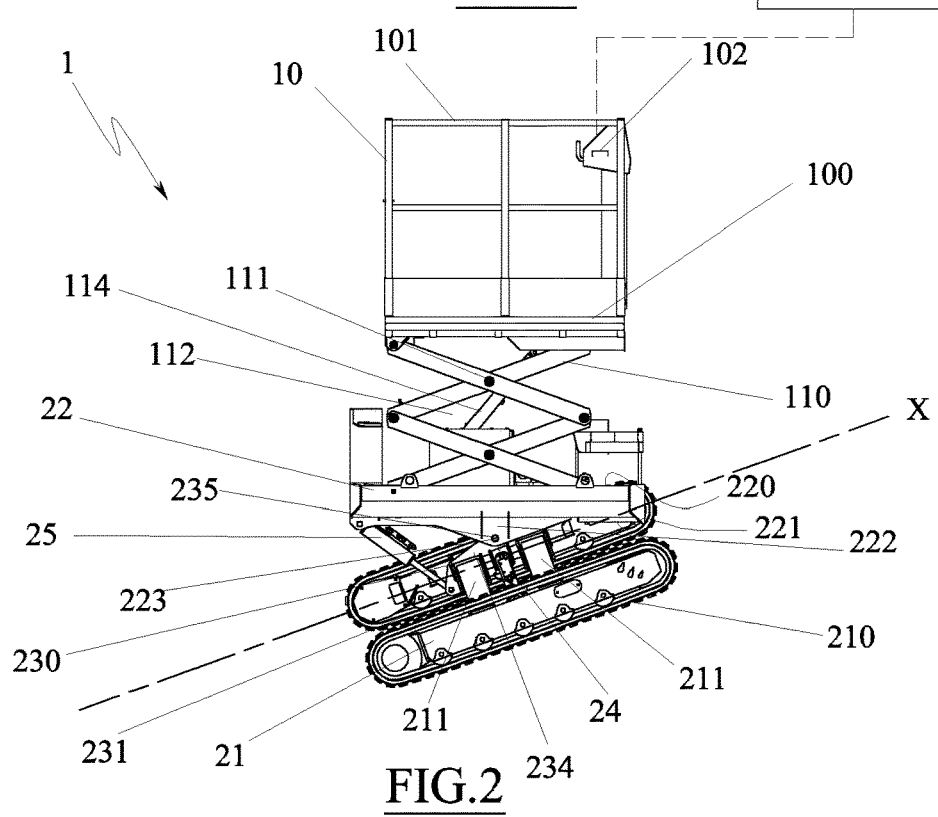
FIG. 2 is a lateral view of the aerial work platform of FIG. 1, wherein the support frame is inclined with respect to the support base and a rest element is at a lower height with respect to the other rest element.
Figure 3:
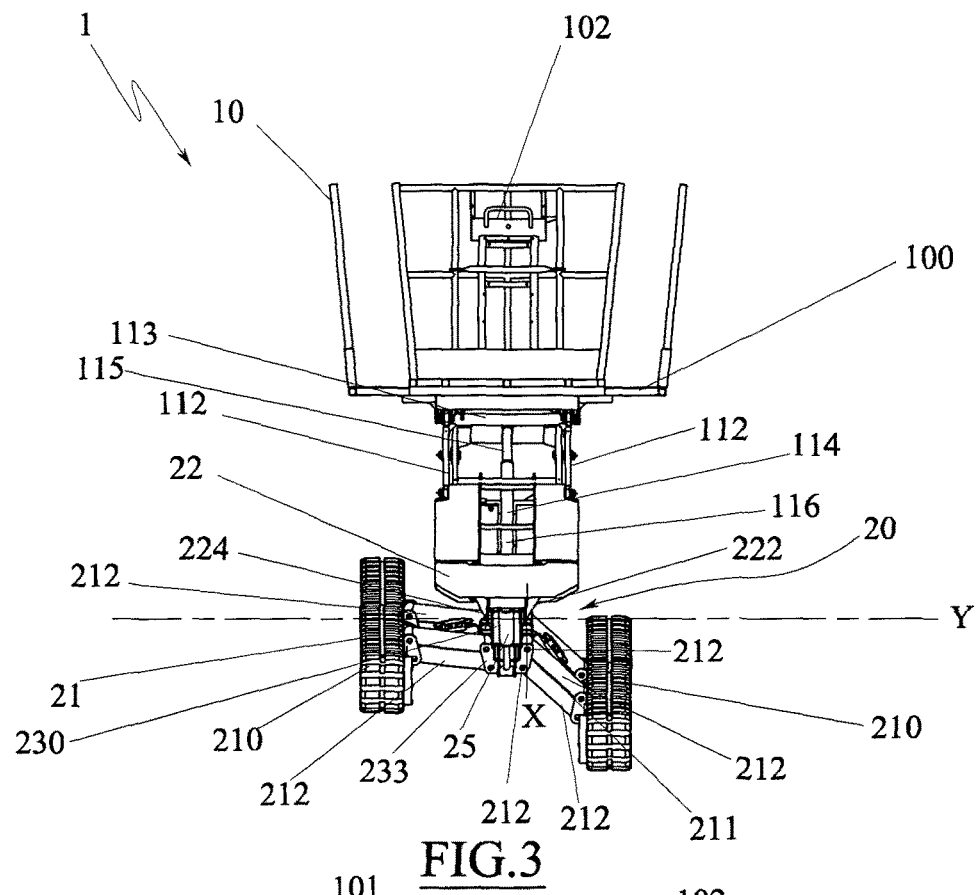
FIG. 3 is a frontal view of the aerial work platform of FIG. 2.
Figure 4:
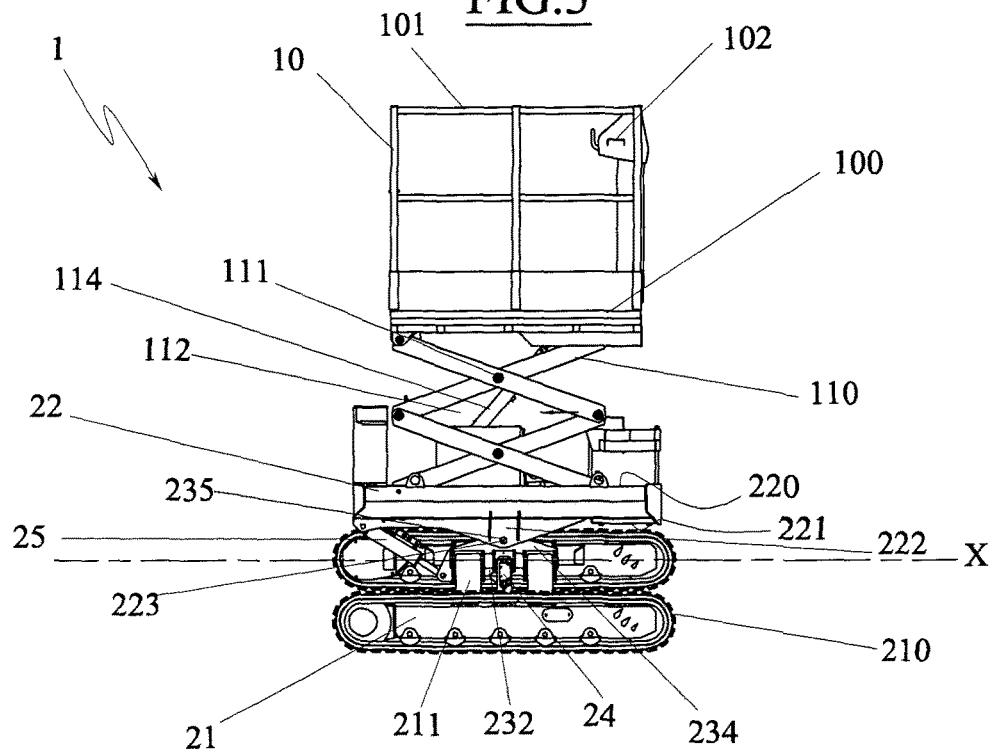
FIG. 4 is a lateral view of the aerial work platform of FIG. 1, wherein the support frame is parallel with respect to the support base and a rest element is at a lower height with respect to the other rest element.
Figure 5:
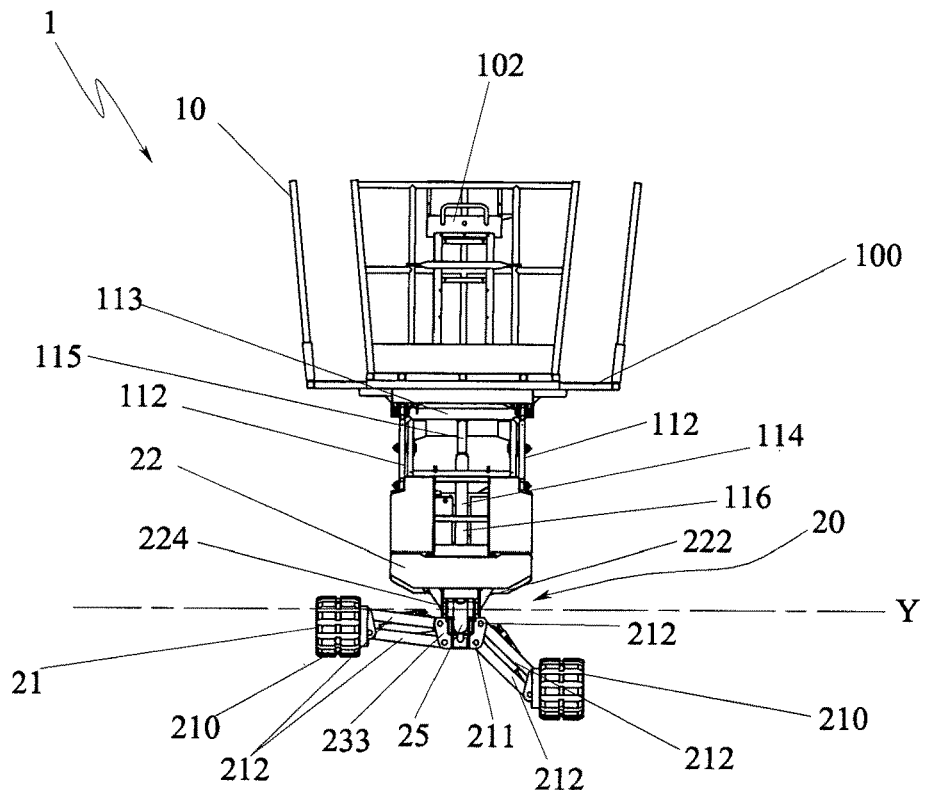
FIG. 5 is a frontal view of the aerial work platform of FIG. 4.
Figure 6:
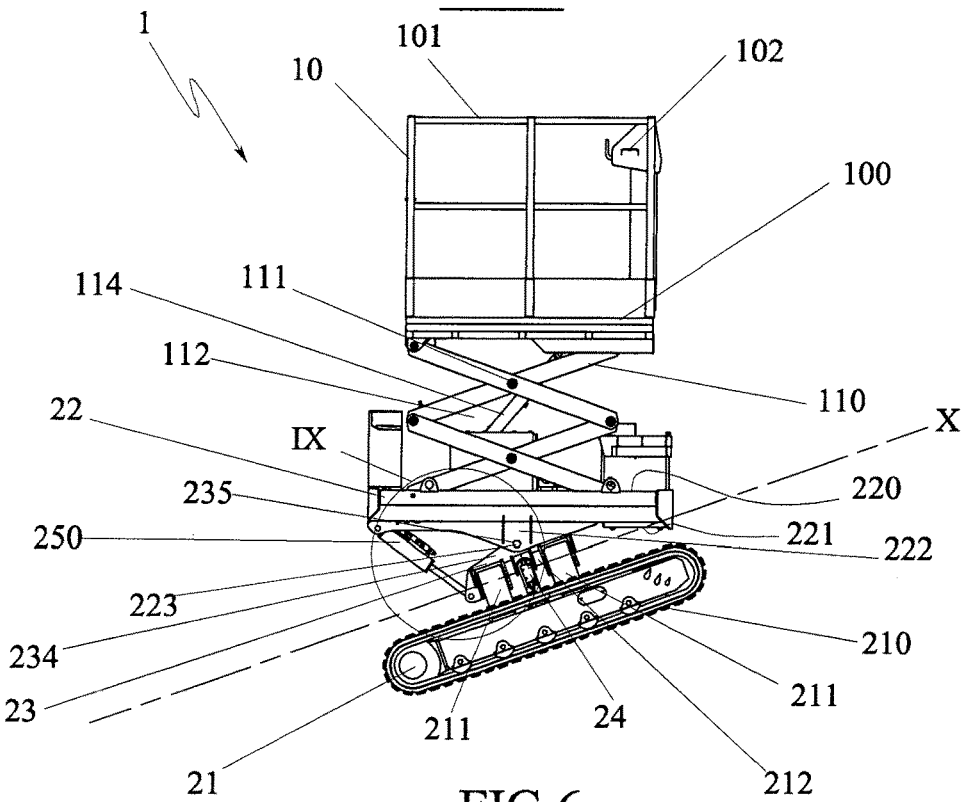
FIG. 6 is a lateral view of the aerial work platform of FIG. 1, where the support frame is inclined with respect to the support base and the rest elements are at the same height.
Figure 7:
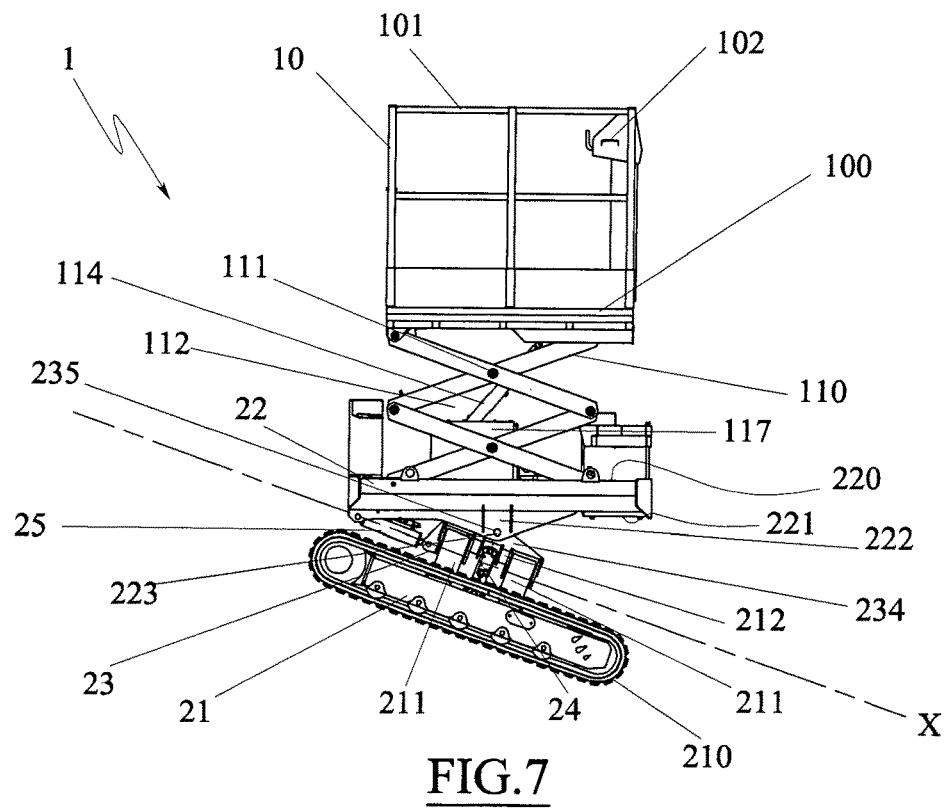
FIG. 7 is a lateral view of the aerial work platform of FIG. 1, where the support frame is inclined on the opposite side with respect to FIG. 6 and with respect to the support base, and the rest elements are at the same height.
Figure 8:
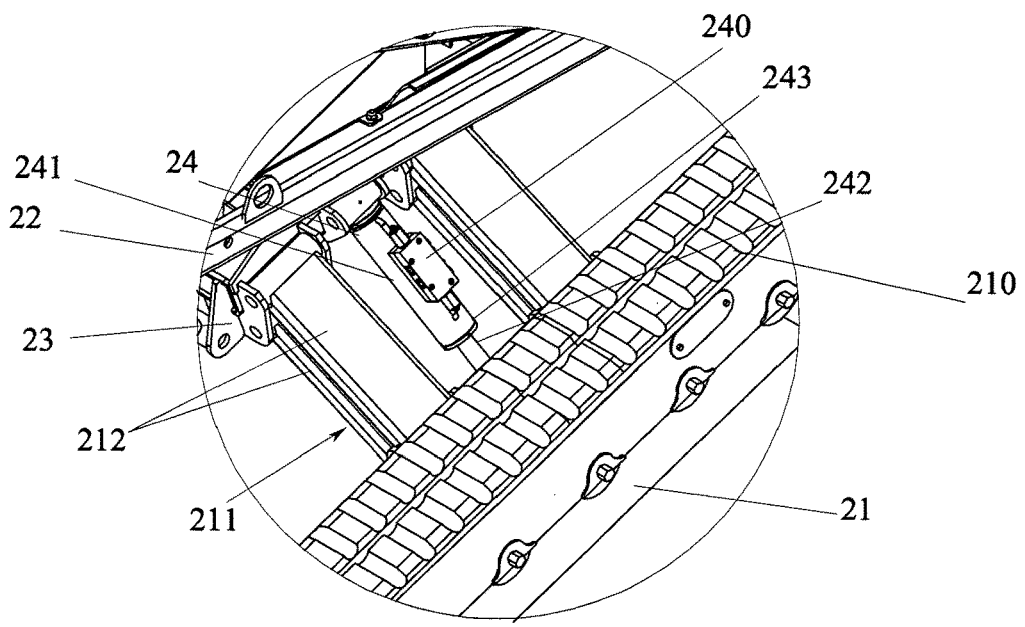
FIG. 8 is a larger scale view of VIII of FIG. 1.
Figure 9:
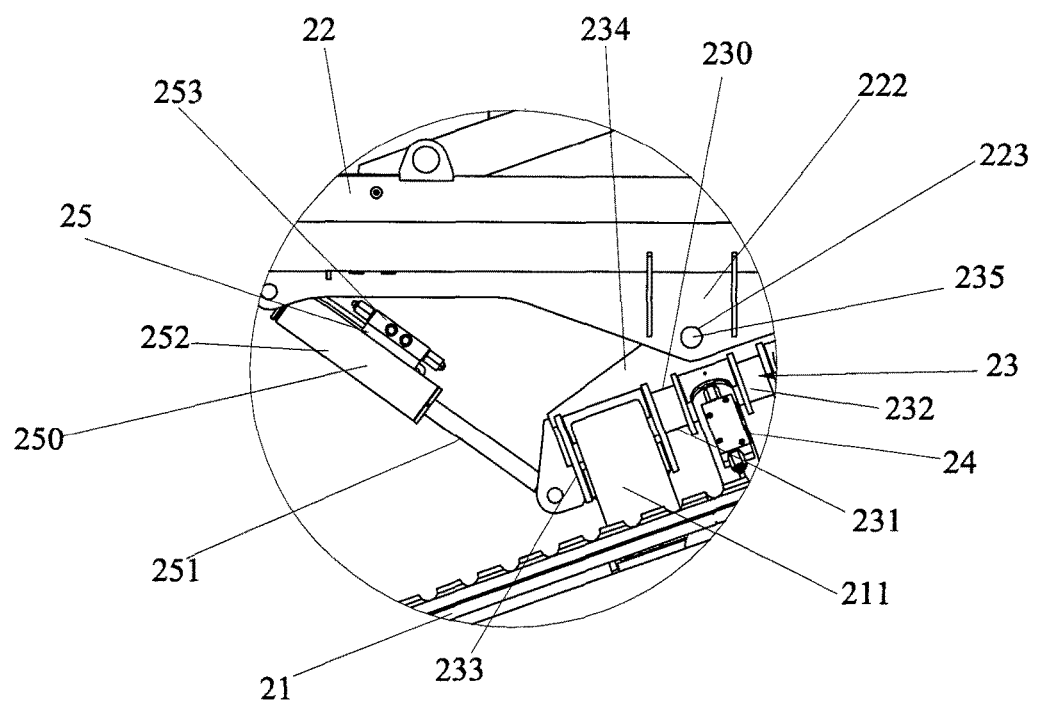
FIG. 9 is a larger scale view of IX of FIG. 6.

With particular reference to the figures of the drawings, reference numeral 1 denotes in its entirety an aerial work platform, for example for vertical raising of an operator.

In particular, the aerial work platform 1 is suitable for carrying out interventions at height in reconstruction and/or construction zones in work sites, in industrial or civil areas and/or in green areas or in any zone raised from the ground which can be reached by means of vertical raising of an operator from the ground.

The aerial work platform 1 comprises a support and levelling group 20, which can define a stable ground rest for the aerial work platform 1.

The support and levelling group 20 comprises a substantially rigid support base 22.

The support base 22 comprises a substantially plate shaped body, in the example parallelepiped with a rectangular base, the upper surface 220 of which is substantially flat and is destined, in use, to remain always in a horizontal position.

The lower surface 221 of the support base 22 is facing towards the ground.

Two parallel and mutually-spaced forks 222 descend, for example perpendicularly, from the lower surface 221, for example made by two substantially triangular metal plates.

The forks 222 are located at a central zone of the prevalent direction of the support base 22.

Each form 222 comprises a hole 223, for example a through-hole aligned with respect to an axis (for example median) parallel to the upper surface 220 (and the lower surface 221).

The support and levelling group 20 comprises, in particular, a support base 22, which is associated inferiorly of the support base 22 so as to support it raised from the ground.

In particular, a support frame 23 is rotatably associated to the support base 22 so as to be able to oscillate with respect to an oscillation axis Y.

The support frame 23 comprises a rigid and substantially parallelepiped body, for example having smaller dimensions than the support base 22, for example so as not to increase the lateral and frontal dimensions thereof.

The support frame 23 comprises an upper base 230 facing the lower surface 221 of the support base 22 and a lower base 231 facing the ground.

Further, the support frame 23 comprises two lateral flanks 232, substantially parallel to the prevalent dimension of the support base 22, and two frontal bases 233.

At least a lug 234 rises, for example perpendicularly, from the upper base 230, for example made using a substantially triangular metal plate.

The lug 234 is for example located at a central zone of the prevalent direction of the support base 23.

Two oscillating pins 235 emerge from the lateral flanks of the lug 234, aligned with respect to an axis (median) parallel to the upper surface 230 (and perpendicular with respect to the prevalent direction of the support frame 23). The oscillating pins 235 are able to be inserted with play in the holes 223 realised in the forks 222, so as to define the oscillation axis Y of the support frame 23 with respect to the support base 22.

The support and levelling group 20 further comprises a pair of ground resting elements 21, which are hinged to the support base 23.

In the preferred embodiment illustrated in the figures, each rest element 21 is defined by a group of motorised tracks 210 that are independent of one another.

Each track group 210, in particular, comprises a train of pinions, of which at least one is motorised, and rest wheels for drawing in rotation a flexible organ, for example made of rubber, a lower branch of which defines a longitudinal surface for resting on the ground.

The train of pinions and the rest wheels is partially contained and supported between two lateral containing walls, of which an internal wall and an external wall.

The longitudinal axis of the longitudinal rest surface defined by each group of tracks 210 is substantially parallel to the prevalent direction of the support base 22 and the advancement direction of the aerial work platform 1.

Further, the longitudinal axis of the longitudinal rest surface of each group of tracks 210 is substantially equal to (or a little larger than) the prevalent dimension of the support base 22.

The size of the longitudinal axis of the longitudinal rest surface of each group of tracks 210 is substantially comprised between 1000 and 4000 $cm^2$, substantially 3200 $cm^2$.

With the groups of tracks 210 the aerial work platform 1 rests on the ground on a large longitudinal surface which enables uniformly distributing the weight of the aerial work platform, guaranteeing an adequate stability even on deformable terrains such as for example earth or sand.

Each group of tracks 210 is hinged to the support frame 23, for example at a respective lateral flank 232 thereof.

For example, each group of tracks 210 is hinged to the support frame 23 so as to vary the height thereof with respect to the support base 22 and/or the support frame 23, with respect to hinge axes X perpendicular to the oscillation axis Y (and parallel to the prevalent direction of the support base 22).

For example, each group of tracks 210 is hinged to a lateral flank 232 of the support frame 23 by means of at least one (in the example two) four-bar hinge, for example a hinged parallelogram 211, so as to be able to translate (while staying parallel to itself) with respect to the support frame 22.

Each four-bar hinge 211, in particular, comprises a pair of (identical) con rods 212, opposite ends of which are hinged, by means of respective hinge pins, respectively to first connecting lugs branching projectingly from the lateral flanks 232 of the support frame 23 and second connecting lugs branching projectingly from the internal lateral containing wall of the group of tracks 210.

The hinge axes X of the four-bar hinge 211, all parallel, are perpendicular to the oscillation axis Y (and therefore to the prevalent direction of the support base 22).

The support and levelling group 20 comprises a first actuating group 24, for movement of each rest element 21 with respect to the support frame 23.

Each first support and levelling group 24 comprises a first jack 241, for example fluid-dynamic, provided with a stem 242 mobile internally of a cylinder 243, wherein the stem 242 in the example is hinged to the track group 210 and the cylinder 243 is hinged to the support frame 23 is hinged to the support frame with respect to hinge axes parallel to the respective articulation axes X.

For example, in the embodiment illustrated in the figures, the cylinder 243 of each first jack 241 is hinged to a lateral flank 232 of the support frame 23 and the stem 242 is hinged to the internal containing wall of the group of tracks 210.

Each first actuating group 24 comprises a hydraulic circuit 240 for actuating the first jack 241, between an extended configuration in which the stem 242 is in an extracted position from the cylinder 243 and a retracted configuration. The variation of the first jack 241 between the extended configuration and the retracted configuration enables moving the relative group of tracks 210 with respect to the support frame 23, so as to vary the height thereof with respect thereto.

In practice, the first jack 241 is configured so as to cause the con rods 212 to oscillate by about 40°, for example by 34°.

When the first jack 241 is in the retracted position the group of tracks 210 (at least a portion thereof) is in a raised position with respect to the height of the support frame 23, while when the first jack 241 is in the extended position the support frame 23 is in a raised position with respect to the group of tracks 210 (at least a portion thereof).

The support and levelling group 20 comprises a second actuating group 25 able to actuate the support frame 23 in oscillation about the oscillation axis Y with respect to the support base 22.

The second actuating group 25 comprises a second jack 250, for example fluid-dynamic, provided with a stem 251 slidingly mobile internally of a cylinder 252, wherein the cylinder 252 is hinged to the support frame 23 and the stem 251 is hinged to the support base 22 along respective hinge axes parallel to and offset with respect to the oscillating axis Y.

For example, in the embodiment illustrated in the figures, the cylinder 252 of the second jack 250 is hinged to a connecting portion branching from the lower surface 221 of the support base 22 and the stem 251 is hinged to one of the frontal bases 233 of the support frame 23.

Each second actuating group 25 comprises a hydraulic circuit 253 for actuating the second jack 250, between an extended configuration in which the stem 251 is in an extracted position from the cylinder 252 and a retracted configuration.

The variation of the second jack 250 between the extended configuration and the retracted configuration enables moving the support base 22 with respect to the support frame 23, so as to vary the height thereof with respect thereto.

In practice, the second jack 250 is configured so as to cause the support base 22 to oscillate with respect to the support frame 23 by about 60°, for example by 40°.

When the second jack 250 is in the retracted the support base 22, i.e. the upper surface 220 (and the lower surface 221) thereof, is inclined with respect to the support frame 23 (i.e. the upper base 230) thereof by an equal and opposite angle with respect to when the second jack 250 is in the extracted position.

In practice, the upper base 230 of the support frame 23 and the upper surface 220 of the support base 22 are parallel to one another when the stem 251 of the second jack 250 is in an intermediate position (about halfway through its travel) between the extracted and retracted positions.

The vertical platform 1 comprises a cage 10 or basket, which can accommodate one or more operators.

The cage 10 comprises a rest plane 100 delimited perimetrally by parapets 101 rising from the rest plane 100, for example fixed or mobile with respect thereto.

The parapets 101 and the rest plane 100 define an open volume superiorly able to accommodate one or more operators.

The cage 10 further comprises, for example located internally of the volume delimited by the rest plane and the parapets 101, a control console 102 for controlling the vertical platform 1, as will be more fully described in the following, which is positioned in the cage 10 so as to be easily accessible by the operator who is positioned internally of the volume defined by the rest plane 100 and the parapets 101.

The rest plane 100 of the cage 10 is supported by a raising device 11, able to activate the cage 10 between a lowered position and a raised position from the ground.

The raising device 11 is in turn supported by the support and levelling group 20.

In particular, the raising device 11 (and therefore the cage 10) are superiorly supported superiorly of the support base 22 (on the upper surface 220 thereof), so that the rest plane 100 of the cage 10 is parallel to the upper surface 220 of the support base 22.

In the embodiment illustrated in the figures, the raising device 11 is of a pantograph or scissors type, and is configured so as to vertically move the cage 10.

The raising device 11 comprises a group of rods 110 hinged in scissors fashion, lower ends of which are hinged to the support base 22 and upper ends of which are hinged to the cage 10, for example at the lower surface of the rest plane 100.

The raising device 11 comprises for example two identical groups of rods 110, parallel and flanked to one another.

The raising device 11 further comprises at least a third jack 114, for example fluid-dynamic, which is provided with a stem 115 mobile internally of a cylinder 116 and is configured for activating the rods of the group of rods 110 in movement.

For example, the cylinder 116 is hinged to the support base 22 and the stem is hinged to a rigid crossbar 113 which connects the two groups of rods 112, according to respective hinge axes parallel to the hinge axes of the rods of the group of rods 112.

The third jack 114 is associated to a respective hydraulic circuit 117 for actuating the third jack 114, between an extended configuration in which the stem 115 is in an extracted position from the cylinder 116 and a retracted configuration.

The variation of the third jack 114 between the extended configuration and the retracted configuration enables varying the group of rods 112 respectively between an extended configuration and a contracted configuration, in which respectively the cage 10 is in a raised position, distal from the support base 22, and in a lowered position, proximal to the support base 22.

In the passage from the contracted conformation to the extended conformation of the group of rods 110 the cage 10 is vertically raised, keeping the rest plane 100 horizontal.

For the aims of the present invention the raising device 11 can be of any type, and therefore different to what is described in the foregoing.

The support and levelling group 20 further comprises one or more sensors (not illustrated) for example able to measure the reciprocal angle of inclination between the support base 22 and the support frame 23 and/or the relative height between each group of tracks 210 (for example by detecting the inclination of the con rods 212) and the support frame 23.

Further, the support and levelling group 20 comprises sensors for detecting the relative height between the support base 22 and the cage 10 (the rest plane 100) thereof, for example by measuring the angle of inclination of a rod of the group of rods 112.

The aerial work platform 1 further comprises a control and command board 200, shown schematically, as of a programmable electronic card type and contained internally of a casing, for example fixed to the support base 22 and/or the cage 10.

The control and command board 200 is operatively connected at least to the first actuating group 24 and the second actuating group 25, so as to command the inclination of the support frame 23 with respect to the support base 22 and the relative height of each group of tracks 210 with respect to the support frame 23.

Further, the control and command board 200 is operatively connected to the groups of tracks 210, for example to the motors thereof, so as to command the movement of the support and levelling group 20.

The control and command board 200 is, again, operatively connected to the control console 102, provided with appropriate command means selectable by the operator on board the cage 10, so as to command the first actuating group 24 and the second actuating group 25 for levelling the aerial work platform 1 and/or the movement of the group of tracks 210 for displacing the aerial work platform 1, in response to respective command selected by the operator.

The control and command board is also operatively connected to the third jack 114 for commanding the raising and lowering of the cage 10 of the aerial work platform 1 by the raising device 11.

The functioning of the levelling group 20 and the aerial work platform 1 as described above is as follows.

The aerial work platform 1, in the rest position, is located with the cage 10 in the lowered position, the group of tracks 210 both resting on a horizontal ground and therefore at the same height (and so as to minimise the vertical or horizontal dimension of the aerial work platform 1) and the support base 22 (i.e. the upper surface 220), as well as the support frame 23 (i.e. the upper base 230) in the horizontal position.

The operator on board the aerial work platform 1, i.e. positioned internally of the cage 10, has access to the command console 102, for example in order to be able to position the aerial work platform 1 in a point where the operation is to take place.

If it is desired to reduce the wheel base of the aerial work platform 1 (for example in order for it to pass through tight or narrow zones), i.e. the distance between the groups of tracts 210, it is sufficient to command the first actuating group 24 so that both of the groups of tracks 210 raise the support base 24 (while keeping it horizontal).

During the displacement of the aerial work platform 1 by means of the group of tracks 210 it is possible to configure the control and command board so that it maintains the support base 22 (and therefore the cage 10 in the lowered configuration thereof) substantially horizontal, in this way automatically adapting the inclination of the group of tracks 210 to respect the slopes of the terrain, or in order for the support base 22 to remain substantially parallel to the support frame 23 and to the rest plane of the group of tracks 210, and so that the operator on board the cage 10 can intervene, when required, to bring the support base 22 to the desired inclination (for example horizontal), for example manually.

When the aerial work platform 1 is positioned in the desired point, the control and command board, for example automatically or semi-automatically, and/or the operator, for example manually, commands the levelling of the aerial work platform.

Should the ground rest position have two different slopes, the control and command board (automatically, semi-automatically or manually) commands the actuation of the first actuating group 24, so that each group of tracks 210 compensates for a first slope, for example in the normal direction to the prevalent direction of the support base 21, and of the second actuating group 25, so that the oscillation of the support frame 23 with respect to the support base 22 (which is brought into the horizontal position) compensates for the second slope, for example in the parallel direction to the prevalent direction of the support base 21.

The control and command board is configured so as to optimise the actuation of the first and second actuating group 24, 25 according to the slopes, so as always to bring the support base 22 into the horizontal position. Once the support base 22 is stable in the horizontal position, even if the aerial work platform 1 is placed resting on an irregular surface (bi-sloping), the operator can actuate, by means of the command console 102, the raising of the cage 10 to the desired height.

The control and command panel is configured such as to determine a maximum lifting travel of the cage 10, as a function of the angle of inclination of the support frame 23 with respect to the support base 22 and/or of the relative height of each rest element 210 with respect to the support frame 23.

In practice, with the aim of avoiding tilting of the aerial work platform 1 and guaranteeing the safety of the operator in the cage 10, the maximum height that can be reached by the cage in the raised position is a function of the angle of inclination of the support base 22 with respect to the rest surface defined from the ground level.

In this way, in order to level and keep the aerial work platform 1 stable, the rest organs on the ground defined by the movement organs of the aerial work platform 1 itself, i.e. the group of tracks 210, are sufficient, without the aid of auxiliary rest organs, such as telescopic feet or the like.

In practice, the aerial work platform 1 with the raising device 11 of the pantograph or scissors type and provided with a support and levelling group 20 that is bi-levelling, such as the one described in the foregoing, enables a levelling of more than +−10° with respect to the hinge axes Y and the oscillation axis X (i.e. in the two perpendicular directions) and/or enables reaching a height of the tread plane of the cage 10 of greater than 3 meters.

The invention as it is conceived is susceptible to numerous modifications, all falling within the scope of the inventive concept.

Further, all the details can be replaced with other technically-equivalent elements.

In practice the materials used, as well as the contingent shapes and dimensions, can be any according to requirements, without forsaking the scope of protection of the following claims.

The invention claimed is:

1. An aerial work platform (1) comprising a supporting levelling group (20), wherein the supporting levelling group (20) comprises:
   a support base (22);
   a support frame (23) inferiorly hinged to the support base (22) about an oscillation axis (Y),
   a first four-bar hinge directly connecting the support frame (23) to a first ground rest element (21), wherein the first four-bar hinge has articulation axes (X) perpendicular to the oscillation axis (Y) and wherein the articulation axes (X) of the first four-bar hinge are parallel to each other, the first four-bar hinge being configured to independently vary a height of the first ground rest element (21) with respect to the support frame (23) between a retracted position and a raised position of the first ground rest element (21);
   a second four-bar hinge independent of the first four-bar hinge, wherein the second four-bar hinge directly connects the support frame (23) to a second ground rest element (21), wherein the second four-bar hinge has articulation axes (X) perpendicular to the oscillation axis (Y), wherein the articulation axes (X) of the second four-bar hinge are parallel to each other and parallel to the articulation axes (X) of the first four-bar hinge, the second four-bar hinge being configured to independently vary a height of the second ground rest element (21) with respect to the support frame (23) between a retracted position and a raised position of the second ground rest element (21); and
   a first actuating group (24) of the first ground rest element (21) configured to move the first ground rest element (21) with respect to the support frame (23) between the retracted position and the raised position of the first ground rest element (21),
   and a further first actuating group (24) of the second ground rest element (21) configured to move the second ground rest element (21) with respect to the support frame (23) between the retracted position and the raised position of the second ground rest element (21),
   the aerial work platform (1) further comprising:
   a containing cage (10), wherein the containing cage (10) is superiorly associated to the support base (22) of the supporting levelling group (20); and
   a raising device (11) interposed between the support base (22) and the containing cage (10), wherein the raising device (11) is configured to actuate the containing cage (10) along a substantially vertical direction between a lowered position of the containing cage (10), wherein the containing cage (10) is proximal to the support base (22), and a raised position of the containing cage (10), wherein the containing cage (10) is distal to the support base (22).

2. The aerial work platform (20) of claim 1, wherein the first ground rest element (21) comprises a first group of motorized tracks (210) defining a longitudinal ground rest surface having a longitudinal axis parallel to the articulation axes (X) of the first four bar hinge; and the second ground rest element (21) comprises a second group of motorized tracks (210) defining a longitudinal ground rest surface having a longitudinal axis parallel to the articulation axes (X) of the second four bar hinge.

3. The aerial work platform (20) of claim 1, wherein the oscillation axis (Y) is substantially a median axis of the support base (22).

4. The aerial work platform (20) of claim 1, wherein the first actuating group (24) of the first ground rest element (21) comprises a first jack (241) provided with a stem (242) slidably inserted within a cylinder (243), wherein one of the stem (242) and the cylinder (243) is hinged to the support frame (23) and another of the stem (242) and the cylinder (243) is hinged to the first ground rest element (21) about respective hinge axes parallel to the articulation axes (X) of the first four-bar hinge; and the first actuating group (24) of the second ground rest element (21) comprises a further first jack (241) provided with a further stem (242) slidably inserted within a further cylinder (243), wherein one of the further stem (242) or the further cylinder (243) is hinged to the support frame (23) and other of the further stem (242) or the further cylinder (243) is hinged to the second ground rest element (21) about respective hinge axes parallel to the articulation axes (X) of the second four-bar hinge.

5. The aerial work platform (20) of claim 1, further comprising a second actuating group (25) configured to rotate the support frame (23) with respect to the support base (22) about the oscillation axis (Y).

6. The aerial work platform (20) of claim 5, wherein the second actuating group (25) comprises a second jack (251) provided with a stem (252) slidably inserted within a cylinder (253), wherein one of the stem (252) and the cylinder (253) is hinged to the support frame (23) about an hinge axis parallel to and offset with respect to the oscillating axis (Y) and another of the stem (252) and the cylinder (253) is hinged to the support base (22) about a hinge axis parallel to and offset with respect to the oscillating axis (Y).

7. The aerial lift work platform (1) of claim 1, wherein the raising device (11) comprises a scissors lift.

8. The aerial lift work platform (1) of claim 1, further comprising a control and command board, operatively connected to a control console (102), the control and command board configured to determine a maximum lifting travel of the containing cage (10), by the raising device (11), as a function of at least one of: an angle of inclination of the support frame (23) with respect to the support base (22), a relative height of the first ground rest element (21) with respect to the support frame (23) or the second ground rest element (21) with respect to the support frame (23).

9. The aerial work platform (20) of claim 1, wherein the first four-bar hinge is a parallelogram linkage and the second four-bar hinge is a parallelogram linkage.

* * * * *